(12) United States Patent
Cho (10) Patent No.: US 8,605,226 B2
(45) Date of Patent: Dec. 10, 2013

(54) PROJECTOR

(75) Inventor: Gyu Ock Cho, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 52 days.

(21) Appl. No.: 13/375,563

(22) PCT Filed: Jan. 26, 2010

(86) PCT No.: PCT/KR2010/000466
§ 371 (c)(1),
(2), (4) Date: Dec. 1, 2011

(87) PCT Pub. No.: WO2010/140751
PCT Pub. Date: Dec. 9, 2010

(65) Prior Publication Data
US 2012/0081617 A1    Apr. 5, 2012

(30) Foreign Application Priority Data
Jun. 5, 2009   (KR) ........................ 10-2009-0049859

(51) Int. Cl.
| H04N 5/74 | (2006.01) |
| H04N 5/64 | (2006.01) |
| H04N 9/31 | (2006.01) |
| F25B 21/02 | (2006.01) |
| G03B 21/26 | (2006.01) |

(52) U.S. Cl.
USPC ................. 348/748; 348/744; 62/3.2; 353/94

(58) Field of Classification Search
None
See application file for complete search history.

(56) References Cited

U.S. PATENT DOCUMENTS

| 7,924,349 B2* | 4/2011 | Tan et al. ....................... 348/744 |
| 2002/0124573 A1* | 9/2002 | Evans et al. ..................... 62/3.2 |
| 2006/0268241 A1* | 11/2006 | Watson et al. .................. 353/94 |

FOREIGN PATENT DOCUMENTS

| JP | 2004-157396 | 6/2004 |
| JP | 2005-257873 | 9/2005 |
| KR | 10-2000-0073969 A | 12/2000 |
| KR | 10-2005-0115095 | 12/2005 |
| KR | 10-0540648 | 1/2006 |
| KR | 10-2006-0017292 | 2/2006 |
| KR | 10-2006-0086376 A | 7/2006 |

OTHER PUBLICATIONS

International Search Report issued in PCT Application No. PCT/KR2010/000466 dated Sep. 7, 2010.

* cited by examiner

*Primary Examiner* — Jefferey Harold
*Assistant Examiner* — Sean Haiem
(74) *Attorney, Agent, or Firm* — KED & Associates, LLP (57) ABSTRACT

A projector is disclosed. The present invention relates to a projector that is able to radiate heat generated in a display device converting a video signal into a projected image.

15 Claims, 10 Drawing Sheets

PROJECTOR

TECHNICAL FIELD

The present invention relates to a projector that is able to radiate heat generated in a display device converting a video signal into a projected image.

BACKGROUND ART

Projectors are electric appliances that project projection lights converted from video signals provided from outside. Such a projection light projected to a screen is converted from both light supplied by a light source such as a lamp provided in a projector and a projection image supplied by a display device.

The lamp used as light source is mounted in a projector-housing and it has large heat. In addition to the lamp, composition system parts composing the light supplied by the lamp has large heat and the amount of heat generated in the display device converting the input video signal into the projection image is quite large.

The heat generated in the light source is cooled by using a cooling fan provided in the housing. However, the size of the display device is substantially small and the cooling of the display device cannot be performed efficiently only by the cooling fan alone.

DISCLOSURE OF INVENTION

Technical Problem

To solve the problems, an object of the present invention is to provide a projector that is able to radiate heat generated in a display device converting a video signal into a projection image efficiently.

Technical Solution

To achieve these objects and other advantages and in accordance with the purpose of the invention, as embodied and broadly described herein, a projector includes a display module converting an image signal into a projecting image; a thermoelectric module mounted to a rear surface of the display module; a control part controlling the display module and the thermoelectric module; and a heat sink member mounted on the thermoelectric module, the heat sink member comprising a plurality of heat radiation pins or heat radiation plates.

The projector may further include a thermal diffusion member configured of metal and provided between the display module and the thermoelectric module.

An area of the thermal diffusion member may be larger than an area of the rear surface of the display module.

The thickness of the thermal diffusion member may be larger than the thickness of the thermoelectric module.

The projector may further include a sealing member configured of silicon or rubber and covering an edge of the thermoelectric module positioned between the thermal diffusion member and the heat sink member.

The thermoelectric module may be divided into a plurality of thermoelectric cells and the plurality of the thermoelectric cells may be connected to the control part.

Different voltages may be applied to at least two the thermoelectric cells, respectively.

Different voltages may be applied to at least two the thermoelectric cells in different points of time, respectively.

The thermoelectric module cells composing the thermoelectric module may include different sized thermoelectric cells.

The thermoelectric cells composing the thermoelectric module may be divided into center portion thermoelectric cells and outer portion thermoelectric cells.

The control part may apply a voltage, which is relatively larger than a voltage applied to the outer portion thermoelectric cells, to the center portion thermoelectric cells or the control part may start to apply a voltage to the center portion thermoelectric cells prior to the outer portion thermoelectric cells.

The display module may be one of a DMD module or a LCOS panel.

The LCOS panel may include blue, green and red LCOS panels converting an image signal into blue, green and red projecting images and the thermoelectric module may be mounted to a rear surface of at least one of the blue, green and red LCOS panels.

At least one of the thermoelectric modules mounted to the blue, green or red LCOS panels may have a different thickness or area from the other ones.

At least one of the thermoelectric modules mounted to the blue, green or red LCOS panels may have a different voltage applied thereto and a different operation point of time from the other ones.

The LCOS panel having the thermoelectric module mounted thereto may include a blue LCOS panel.

In another aspect of the present invention, a projector includes a DMD module converting an image signal into a projecting image; a heat transfer member absorbing heat generated from the DMD module in a state of contacting with a rear surface of the DMD module on one surface and radiating the heat absorbed on the other surface and absorbing and radiating surfaces are changeable according to a direction of the DC voltage applying; and a heat sink member absorbing the heat transferred by the heat transfer member, the heat sink member comprising a heat sink area extending part for expanding a heat sink area.

The projector may further include a thermal diffusion member provided between the heat transfer member and the DMD module to expand the heat absorbing area, the thermal diffusion member having an area larger than an area of the rear surface of the DMD module, wherein the heat transfer member may be divided into a plurality of members operating selectively or sequentially to enhance a heat transfer function.

The projector may further include a light source comprising a lamp, wherein at least one of the divided heat transfer members near to the light source may start to operate prior to the other ones or has a relatively higher voltage applied thereto.

The heat transfer member may be configured of heat transfer members divided in two lines and two columns and at least one of the divided heat transfer members positioned in a column near to the light source may start operation prior to the other ones or have a relatively higher voltage applied thereto.

Advantageous Effects

The present invention has following advantageous effects.

The projector according to the present invention is able to radiate heat generated in a display device converting a video signal into a projection image efficiently.

BRIEF DESCRIPTION OF THE DRAWINGS

The accompanying drawings, which are included to provide further understanding of the disclosure and are incorporated in and constitute a part of this application, illustrate embodiments of the disclosure and together with the description serve to explain the principle of the disclosure.

In the drawings.

BEST MODE

Reference will now be made in detail to the specific embodiments of the present invention, examples of which are illustrated in the accompanying drawings. Wherever possible, the same reference numbers will be used throughout the drawings to refer to the same or like parts.

Figure 1:
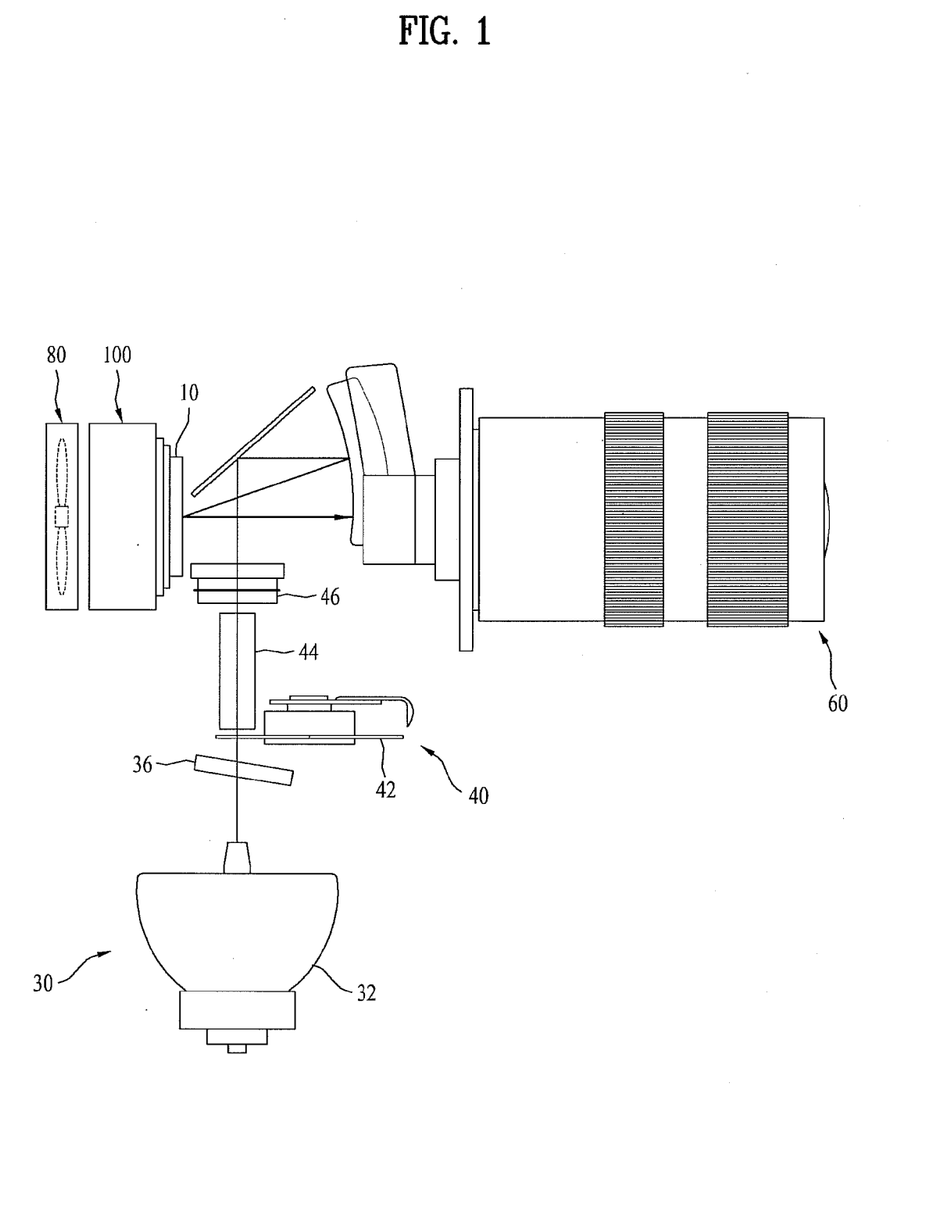
FIG. 1 is a plane view illustrating key parts of a DLP projector as example of the projector according to an exemplary embodiment of present invention and FIG. 2 is a perspective view of the DLP projector.
Figure 2:
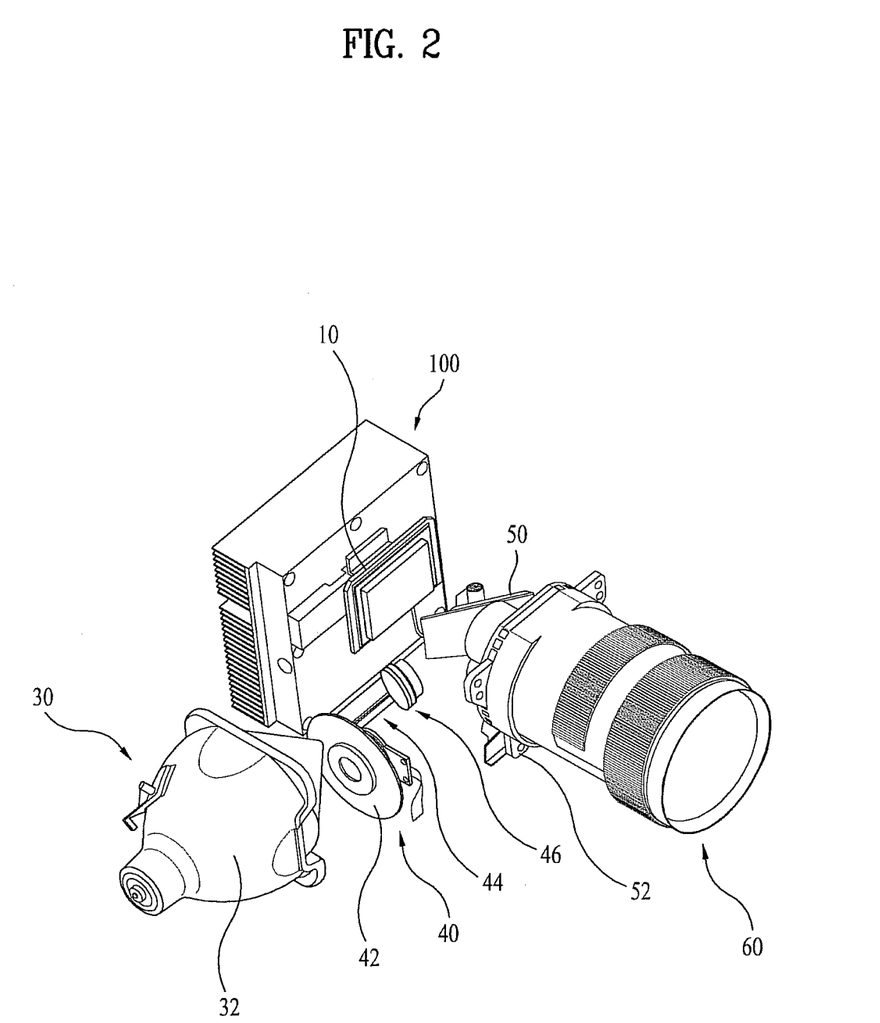

FIG. 1 is a plane view illustrating a DLP type projector as example of a projector according to an exemplary embodiment of the present invention and FIG. 2 is a perspective view of FIG. 1.

A projector including a configuration shown in FIGS. 1 and 2 includes a DMD module 10 converting an image signal supplied from outside into a projecting image, a light source part 30 emitting a light, a projection lens assembly 60 projecting the image to a screen and a cooling device 100 cooling the DMD module 10.

The light source part 30 may use a lamp or LED (Light Emitting Diode) that can generate a light by using the supplied electric power. This embodiment uses the lamp.

The light source part 30 includes a lamp (not shown) emitting a light, specifically, a white light and a lamp case 32 protecting the lamp. A reflector may be provided on an inner surface of the lamp case 32 to collect the lights emitted from the lamp.

The light emitted from the light source part 30 passes a color wheel assembly 40.

The color wheel assembly 40 includes a color wheel 42 and a motor (not shown). The color wheel 42 is rotated at a high rotation number, with partitioned portion for red, green and blue.

A heat radiation pin or fan may be provided in the color wheel assembly 40 to cool the motor. An ultraviolet ray (UV) blocking filter 36 may be provided between the lamp assembly 32 and the color wheel assembly 40 to remove a UV ray from the light outputted from the lamp.

The color wheel 42 formed in a disc-shape having a predetermined diameter and the disc is divided portions for red, green and blue. As a result, an unpolarized light of the lights collected by the reflector of the light source part 30 is spectralized to one of the red, green and blue by the colors of the color wheel 42.

Moreover, a light tunnel 44 is provided in a direction of the light having transmitted the color wheel assembly 40. Here, the light tunnel 44 may be referenced to as rod lens and it makes a color light transmitting the color wheel 42 uniform.

Four long rectangular-shaped mirrors are jointed, oppositely facing each other, to form the light tunnel 44. The light tunnel totally or diffusedly reflects the lights divided into red, green and blue lights via the color wheel assembly 40 to make brightness of the lights distributed uniformly.

An illumination lens 46 is provided in a direction of the light from the light tunnel and the illumination lens 46 collects the lights having transmitted the light tunnel 44.

The lights collected by the illumination lens 46 are reflected by a mirror 50 or aspheric mirror 52 to be projected toward the DMD module 10. The DMD module 10 converts an image signal supplied from the outside into a projecting image and it converts the emitted light into a projecting light to supply the projecting light to a projection lens assembly 60.

The projection lens assembly 60 magnifies and projects the projecting light reflected by the DMD module to the screen. The projection lens assembly 60 is configured of a convex lens and concave lens collecting or emitting the lights to make images of the lights optically.

Furthermore, a cooling device 100 may be provided to cool or heat-radiate the heat generated by the DMD module 10. The cooling device 100 is in close contact with a rear surface of the DMD module 10 to cool down the DMD module 10. The cooling device 100 may be formed of metal having a high thermal conductivity such as aluminum. A cooling fan 80 is provided in a rear surface of the cooling device 100 to blow air such that the cooling device 100 may be cooled down.

As follows, the cooling device cooling down the DMD module 10 will be described in reference to FIGS. 3 to 6.

Figure 3:
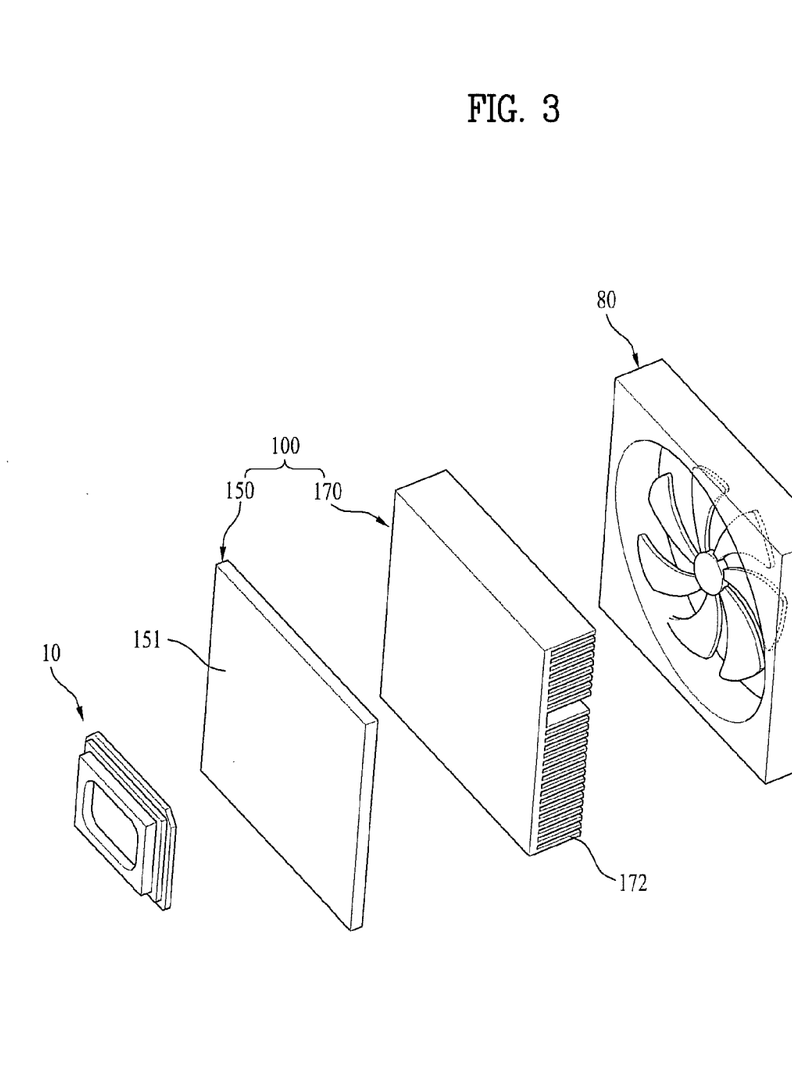
FIG. 3 is a diagram illustrating a DMD device as example of display device provided in the projector according to the present invention and a cooling device according to an embodiment.

FIG. 3 is a diagram illustrating a DMD module as display module and a cooling device provided in the projector according to the embodiment of the present invention. FIG. 3 shows that the DMD module 10 is used as display module converting the image signal supplied from outside into the projecting image. The DMD module 10 has quite a heat value while converting the image signal into the projecting image. Because of that, it is necessary to sink the heat generated in the DMD module 10 efficiently in order to improve reliability and durability of the projector.

The conventional cooling device will have a heat sink member configured of a cooling pin or plate directly connected to a heat unit. In contrast, the projector according to this embodiment uses a thermoelectric module to radiate the heat generated from the DMD module efficiently.

Here, 'thermoelectric module' is referenced to as module or assembly using diverse effects led by interrelation between heat and electricity. The thermoelectric module may be configured of a single thermoelectric cell or a plurality of thermoelectric cells.

The thermoelectric module may be a thermistor used to stabilize a circuit and to detect heat, electricity and lights, a module using Seebeck effect to measure a temperature, a Peltier-module used to fabricate a freezer or thermostat and the like.

Moreover, the thermoelectric module may be a thermistor using temperature changes of electric resistance, a module using Seebeck effect that an electricmotive force is generated by temperature change, a Peltier-module using Peltier effect that heat absorption or generation occurs because of electric currents and the like. The thermistor is a kind of a semiconductor having electric resistance considerably changed by a temperature and it includes a NTC thermistor (Negative Temperature Coefficient Thermistor) having electric resistance reduced by temperature increase and a PCT thermistor (Positive Temperature Coefficient Thermistor) having resistance increased by the temperature increase. The thermistor is mixed and sintered of oxide components such as molybdenum, nickel, cobalt, iron and the like and it is used to stabilize a circuit and to detect heat, electricity and lights.

According to Peltier effect, ends of two different metals are jointed and an electric current flows along the connected metals. If then, a terminal absorbs heat and the other terminal generates heat according to the direct of the electric current. If semiconductors such as bismuth and tellurium having a different electric conducting way are used, instead of the two different kinds of metals, a Peltier module capable of performing efficient heat absorption and heat generation may be acquired. This enables the heat absorption and heat generation changed according to the direction of electric current and makes the heat absorption and heat generation adjustable according to the quantity of the currents, only to be applicable to fabrication of a freezer having a small capacity and an acute thermostat near a normal temperature.

The thermoelectric module used to cool the DMD module converting the image signal into the projecting image according to the projector of the present invention may be the Peltier module.

If a DC voltage is applied to both ends of the thermoelectric module, heat moves according to flow of electrons in an N-type and according to flow of holes according to a P-type such that the temperature of a heat absorbing part may decrease. Since there is potential energy difference in electrons of the metals, an energy has to be gained from outside to make the electron move to the metal having a high potential energy from the metal having a low potential energy. As a result, heat energy is taken away at a point of connection and heat energy is discharged in reverse. Such the heat absorption (cooling) may be in proportion to the flow of electric currents and to the number of thermoelectric couples (couples of N and P-types).

The thermoelectric cell composing the thermoelectric module used in the cooling device of the projector according to the present invention may be 10 mm to 50 mm wide and long (that is, an overall area) and it may be is 2 mm to 6 mm thick. Such the thermoelectric module may be divided into a plurality of cells. The size of a thermal diffusion member or heat sink member which will be described later may be determined and the size of the appropriate thermoelectric module may be determined in consideration of the heat value of the DMD module.

If the plurality of the thermoelectric modules are provided, detailed explanation will be described later. The heat generated in the DMD module may be absorbed by using such the thermoelectric module (or Peltier module) and the absorbed heat may be transfered to the heat sink member to radiate the heat.

As shown in FIG. 3, the size of the DMD module 10 is smaller than the size of the heat sink member having the heat radiation pin or plate to expand a heat sink area. The projecting image is displayed on a front surface of the DMD module 10 and the lights spectralized by the color wheel is reflected on the DMD module 10 only to form the projecting light. To cool the DMD module, the heat radiation has to be performed on a rear surface of the DMD module, not a front surface.

However, the size of the DMD module 10 is small and if the DMD module is cooled directly by the fan, sufficient cooling performance cannot be secured. As a result, a heat sink area is required to be enlarged even if the cooling fan is used to cool the DMD module.

As shown in FIG. 3, the heat sink member 170 including a plurality of heat radiation plates 172 is cooled by the cooling fan 80.

The heat sink member may include the plurality of the heat radiation plates (172 or heat radiation pins) as heat sink expanding part for expanding the heat sink area. According to the embodiment shown in FIG. 3, the heat sink member may have the plurality of the heat radiation plates formed in parallel which can expand the heat sink area.

As mentioned above, the DMD module 10 has the small size and high heat value. If depending on natural heat conduction by mounting the heat sink member on a rear surface of the DMD module in a state of simple contact, sufficient cooling performance is not easy to secure.

As the DMD module 10 has the small size and high heat value, an auxiliary heat transfer member may be provided to radiate the heat via the large heat sink member efficiently.

The projector according to the present invention uses the thermoelectric module (150) as heat transfer member.

If the thermoelectric module 150 is connected to a DC power, a first end is getting cold and the other end is getting hot. If a direction of power application is set to cool down a heat absorption surface of the thermoelectric module contacting the DMD module, the heat generated from the DMD module is absorbed from the heat absorption surface in contact with the DMD module 10 and the heat radiation is performed in the other opposite surface.

As a result, the thermoelectric module absorbs heat on a rear surface of the DMD module and it radiates heat on a surface of the DMD module contacting with the heat sink member.

Thermal grease may be coated on or Thermal Pad may be attached to front and rear surfaces of the thermoelectric module 150, in order to maximize the heat transfer performance of the thermoelectric module 150.

The heat sink member 170 absorbs the heat transferred from the thermoelectric module 150, not from the DMD module 10, and it radiates the transferred heat via the plurality of the heat radiation pins 172 such that the heat may be cooled by the cooling fan 80 located near the heat sink member.

The conventional projector can be cooled by a cooling method including an air cooled type and water cooled type. The air cooled type uses wind blown by the cooling fan and the water cooled type performs cooling by circulating water.

After the light source and the display module are cooled by air sucked from outside, the air used for the cooling is discharged according to the air cooled type. Such the air cooled type cooling method determines the amount of wind required for efficient cooling based on the temperature inside the projector. In case brightness of the image projected from the projector is bright (output of the light source part is increased), the amount of wind blown by the cooling fan has to be increased and more noise will be generated.

The air blow capacity of the cooling fan has to be guaranteed to exhaust the heat generated in the display module 10 having the relatively small size quickly. However, if the thermoelectric module 150 is used, the heat generated in the display module 10 may be moved to the heat sink member 170 by the thermoelectric module 150 and thus the cooling fan is used to cool the radiation member 170 including the heat radiation pins and the like indirectly.

In case the thermoelectric module 150 is used, cooling efficiency may be improved even when the cooling fan having an identical capacity is used and the cooling fan having the relatively small size or air blowing capacity may be used. As a result, the overall size of the projector may be reduced advantageously.

If the thermoelectric module is used, the cost can be saved in comparison to the water cooled type cooling method. Because of that, it is preferable that the thermoelectric module 150 is used to cool the display module as a method for minimizing the generated noise with the reduced size of the projector having the identical capacity.

Figure 4:
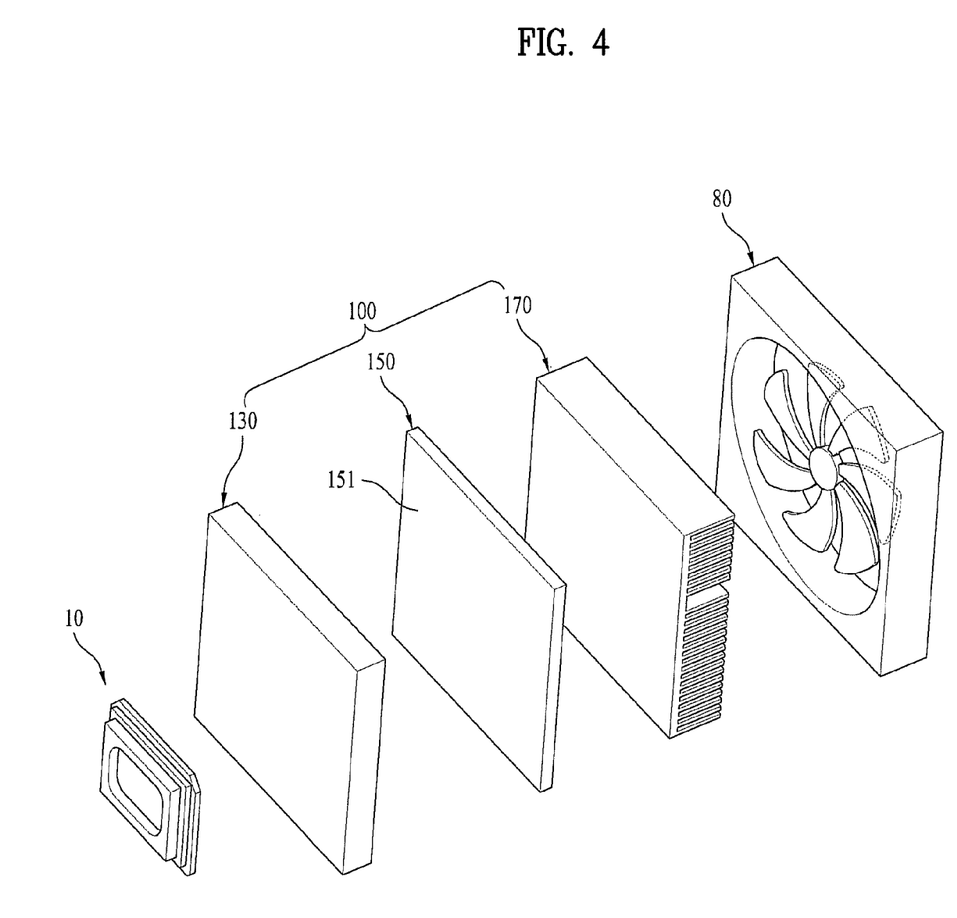
FIG. 4 is a diagram illustrating a DMD device and a cooling device according to another embodiment.

FIG. 4 is a diagram illustrating a display module and a cooling device provided in a projector according to another embodiment of the present invention. Repeated description similar to the description in reference to FIG. 3 will be omitted for convenience sake.

According to this embodiment shown in FIG. 4, the projector may further include an auxiliary thermal diffusion member 130 provided between the thermoelectric module 150 and the DMD module 10.

The thermal diffusion member 130 may be fabricated in a plate shape made of metal also and it expands the heat absorption area performed by the thermoelectric module 150.

As mentioned above, the DMD module 10 has the smaller size than the heat sink member 170. Even if the size of the thermoelectric module 150 is corresponding to the size of the heat sink member 170, it is impossible to utilize the entire heat-absorption area of the thermoelectric module.

Because of that, the thermal, diffusion member 130 may be further provided to suck the heat generated from the DMD module 10 smoothly on the entire heat-absorption surface of the thermoelectric module 150.

As shown in FIG. 4, the thickness of the thermal diffusion member 130 is larger than that of the thermoelectric module 150. Even if the heat generated from the DMD module 10 is conducted only from the surface of the thermal diffusion member 130 contacting with the DMD module 10, with the appropriately thick thermal diffusion member 130, temperature difference for each area on the surface of the thermal diffusion member 130 contacting with the thermoelectric module 150 may be reduced as much as possible.

If the thermal diffusion member is thin, heat inside the thermal diffusion member has a fast speed of heat transfer toward the thickness direction such that the time for spreading the heat in a horizontal direction may be insufficient. Because of that, there would be large temperature difference in the contact surfaces of both the thermal diffusion member 130 and the thermoelectric module 150.

In this case, the heat is intensively transferred to a predetermined portion of the thermoelectric module but the thermoelectric module has an identical cooling capacity for each inner portion. As a result, the heat larger than the heat transfer capacity is supplied to a predetermined portion of the thermoelectric module and relatively small heat is transferred to the other portions, only to fail accomplish balance of the cooling performance and to reduce heat transfer efficiency.

That is, a predetermined portion of the thermal diffusion member corresponding to the position of the DMD module 10 has a relatively high temperature and the other neighboring portion has a relatively low temperature.

The thickness of the thermal diffusion member 130 may be formed larger than a predetermined thickness to reduce temperature difference on the contact surface of the thermal diffusion member 130 in contact with the heat absorption surface of the thermoelectric module 150.

While the heat is transferred to a predetermined portion of the thermal diffusion member from the DMD module 10, the heat is conducted in the thermal diffusion member 130 in diverse directions and heat is generated in a larger area than the heat absorption area of the contact surface with the thermoelectric module 150. Thus, the heat absorption area of the heat absorbing surface of the thermoelectric module 150 is enlarged and the temperature difference on the surface of the thermal diffusion member 130 contacting with the heat absorbing surface of the thermoelectric module 150 may be reduced as much as possible.

That is, the heat is transferred to the thermal diffusion member 130 via the contacting surface of the thermal diffusion with the DMD module 10 and this contacting surface may be a predetermined center portion of the thermal diffusion member. This heat is diffused in a horizontal direction with respect to the thickness of the thermal diffusion member 130 while transferred along the direction of the thickness of the thermal diffusion member. As a result, the heat may be transferred to the thermoelectric module on the heat generating surface of the thermal diffusion member 130, that is, the contacting surface of the thermal diffusion member with the thermoelectric module, with the larger area for heat generating than the area for heat absorbing by contacting with the DMD module.

The area of the thermoelectric module 150 is in proportion to the heat transfer amount. In case of an identical area, the thickness of the thermoelectric module is in inverse proportion to the heat transfer amount. If the thickness and heat transfer amount of the thermoelectric module 150 is determined, the thickness of the thermal diffusion member 130 may be determined experimentally.

Figure 5:
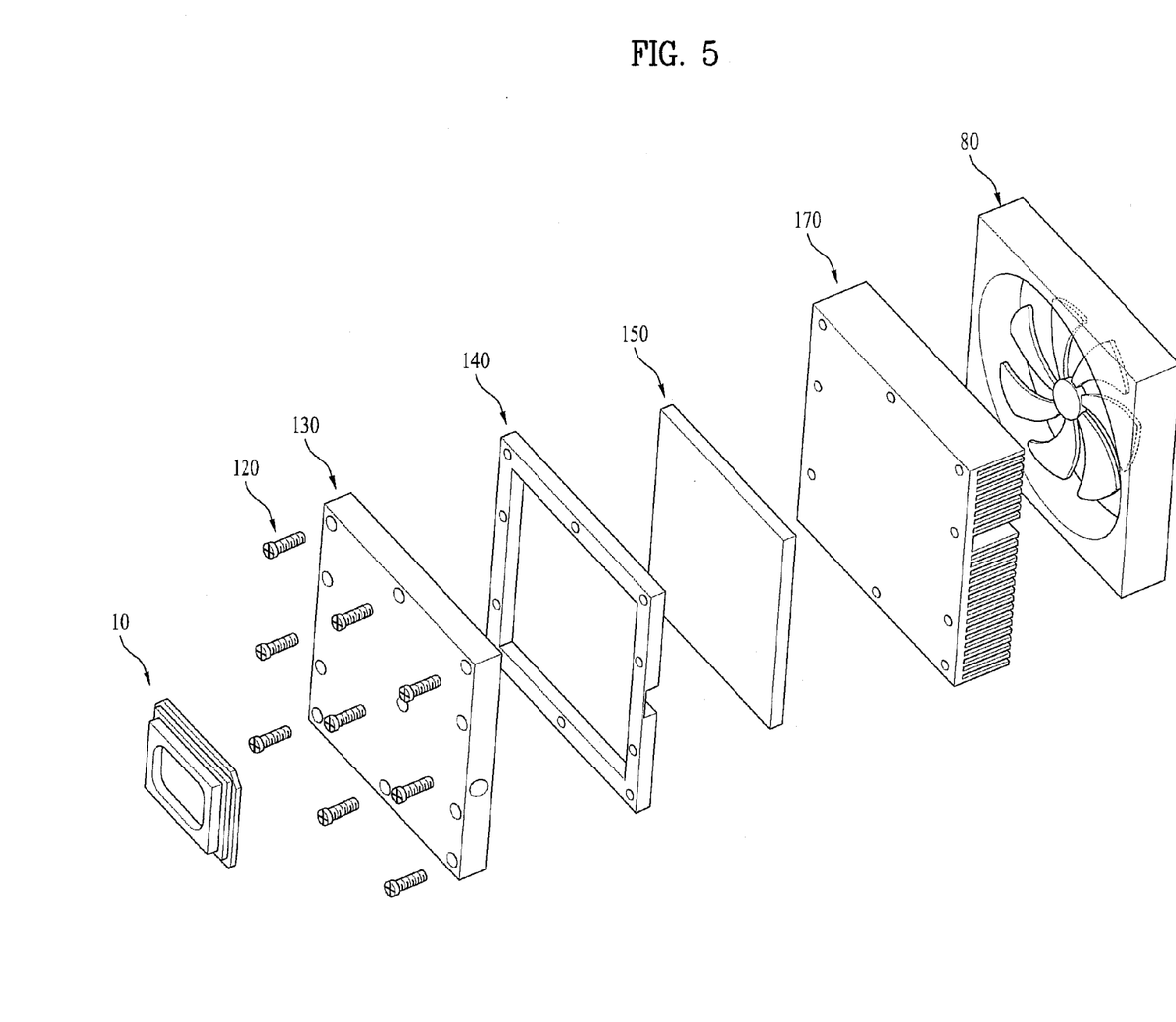
FIG. 5 is a diagram illustrating a DMD device and a cooling device according to a further embodiment.

FIG. 5 is a diagram illustrating a DMD module as display module a projector and a cooling device according to another embodiment of the present invention. Repeated description in comparison to the above embodiment will be omitted. The thermoelectric module is very sensitive to dust or humidity and it is required to seal the thermoelectric module 150 to prevent dust and humidity from reaching the thermoelectric module 150.

As shown in FIG. 5, a sealing member 140 may be further provided in the projector according to this embodiment to seal an edge portion of thermoelectric module 150. The sealing member 140 may be fabricated of silicone or rubber to cover the edge portion of the thermoelectric module 150 and it may be a rectangular ring type or band type.

To allow the sealing member 140 to seal the edge portion of the thermoelectric module effectively and to be installed smoothly, the area of the thermoelectric module 150 may be smaller than the areas of the heat sink member and thermal diffusion member.

If the area of the thermoelectric module 150 is smaller than each area of the thermal diffusion member 130 and heat sink member 170, a recess will be formed between the thermal diffusion member and the heat sink member.

Specifically, since the size of the thermoelectric module 150 is small, a step is formed between the heat sink member 170 and the thermal diffusion member 150.

The sealing member 140 may be coupled by a coupling member 120 for coupling the thermal diffusion member 130 and the heat sink member 170 together with them. Here, the coupling member 120 may be a bolt or the like. The size of the thermoelectric module 150 is smaller than that of the thermal diffusion member or heat sink member. Because of that, the coupling member 120 may not pass the thermoelectric module 150 but edge portions of the thermal diffusion member 130, sealing member 140 and the heat sink member sequentially.

Figure 6:
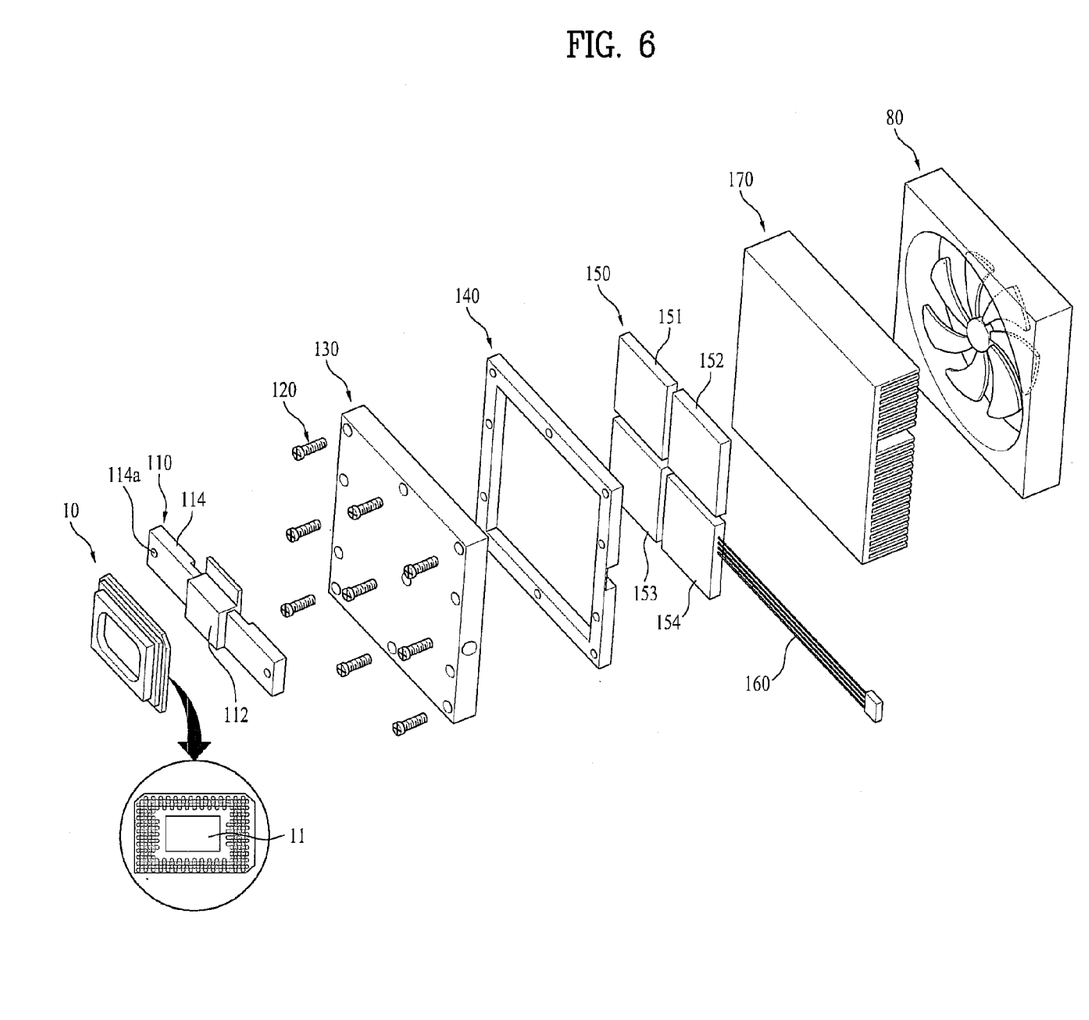
FIG. 6 is a diagram illustrating a DMD device and a cooling device according to a still further embodiment

FIG. 6 is a diagram illustrating a DMD module as display module a projector and a cooling device according to a further embodiment of the present invention. According to this embodiment shown in FIG. 6, the thermoelectric module 150 may be divided into plural ones to be electrically connected to a control part of the projector. If the thermoelectric module 150 is divided into the plural ones, each of the divided ones may be connected to the control part independently or serially.

If the divided ones are connected to the control part independently, the heat transfer performance of each divided thermoelectric module may be controllable independently.

According to the embodiment shown in FIG. 6, the thermoelectric module includes first to fourth thermoelectric cells arranged by 2×2. In case the thermoelectric module 150 is divided into plural thermoelectric cells, each of the thermoelectric cells is connected to the control part of the projector and the control part selectively, applies a DC voltage to each thermoelectric cells composing the thermoelectric modules 150.

As mentioned above, the heat absorbing surface of the thermoelectric module 150 may be changed into the heat radiating surface and vice versa based on the application direction of the DC voltage. If the thermoelectric module is divided into the plural ones as shown in FIG. 6, the direction of the DC voltage applied to each thermoelectric module has to be equal to that of the DC voltage applied to the other ones.

When the thermoelectric module 150 is divided into the plural ones, a predetermined one of the thermoelectric modules may be selectively operated. If malfunction occurs in a specific one or more of the thermoelectric modules, the malfunctioned one or more may be replaceable advantageously.

If operating only a predetermined one or more of the thermoelectric modules, the heat transfer performance may be controllable advantageously. As a result, according to this embodiment shown in FIG. 6, only the first thermoelectric cell 151 and the fourth thermoelectric cell 154 may be operated or only the second thermoelectric cell 152 and the third thermoelectric cell 153 may be operated such that the heat transfer performance may be adjustable.

Moreover, the heat transfer performance may be controllable by adjusting the size of the DC voltage applied to each thermoelectric module 150. The divided thermoelectric modules will be described in detail later.

The embodiment shown in FIG. 6 may use an auxiliary securing member 110 to secure the DMD module 10 to the thermal diffusion member 130. The DMD module 10 is provided in a module type including a DMD chip. The securing member 110 is used to secure the DMD module 10 to the thermal diffusion member 130. The securing member 110 may include a contacting part 112 in contact with a rear surface (11, see an enlarged view of a circle) of the DMD chip of the DMD module 10 and a securing part 114. The contacting part 112 absorbs the heat from the DMD module 10 and the securing part 114 is secured to the thermal diffusion member.

The securing part 114 is seated on the rear surface 11 of the DMD module 10, extended from both opposite sides of the contacting part 112 in contact with the rear surface of the DMD chip and it includes a securing hole 114a having the coupling member 120 pass there through. As a result, the contacting part 112 absorbs the heat in contact with the rear surface 11 of the DMD chip to transfer the heat to the securing part 114 and the securing part re-transfers the heat to the thermal diffusion member 130.

The securing member 110 may be secured to the thermal diffusion member by a securing element and the coupling member 120 may be used to securing the securing member 110 to the thermal diffusion member 130.

Here, a cable 160 may be further provided to connect the four divided thermoelectric cells 151, 152, 153 and 154 with a power supply part of the projector electrically. As mentioned above, each of the thermoelectric modules has to be connected to the power supply part independently to control the divided thermoelectric modules selectively.

Figure 7:
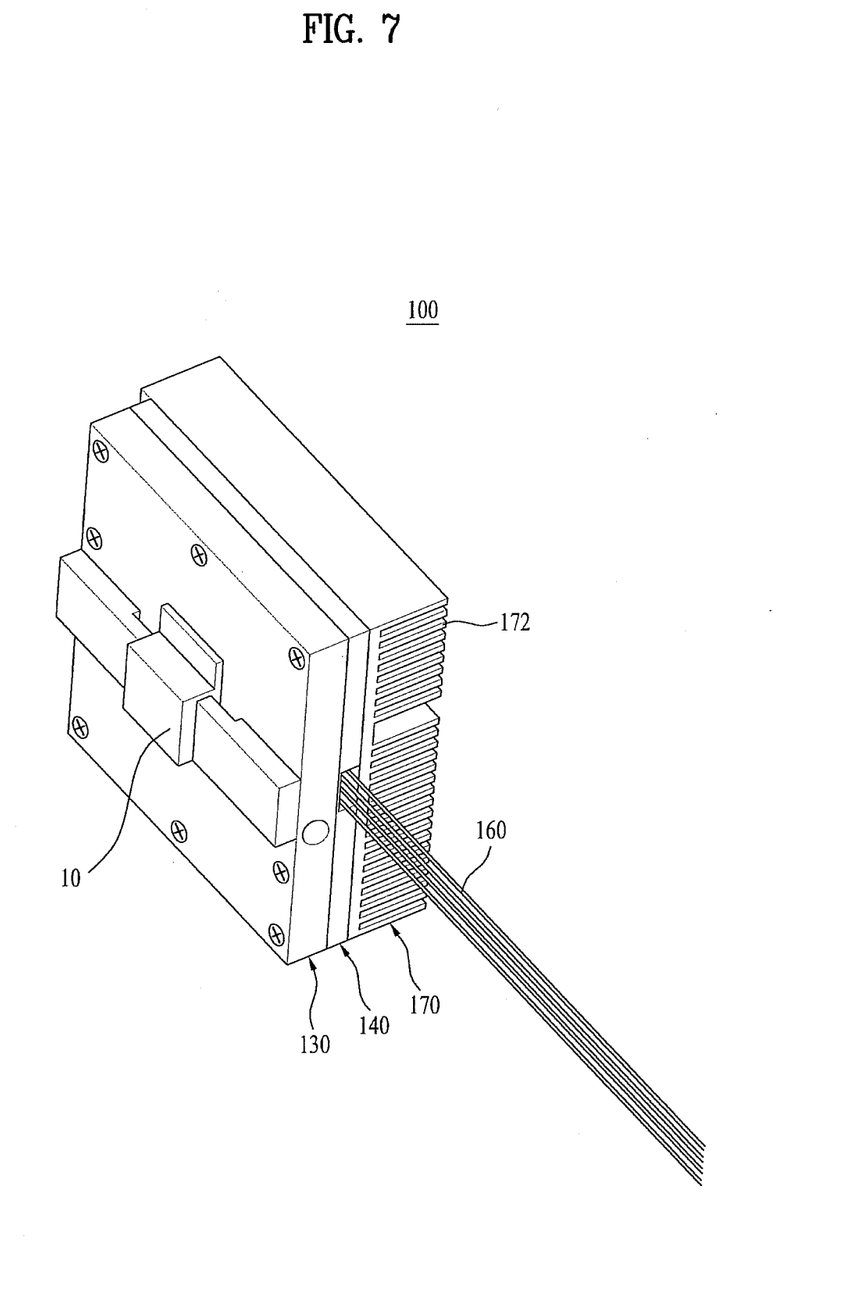
FIG. 7 is a diagram illustrating an assembling state of the DMD device 10 and the cooling device 100.

FIG. 7 is a diagram illustrating an assembly state of the DMD module 10 and the cooling device 100. If the size of each thermoelectric module is smaller than that of the thermal diffusion member 130 and of the heat sink member 170 as mentioned above, the sealing member 140 may be insertedly secured to the recess formed by the step formed between the thermal diffusion member 130 and the heat sink member 170.

Figure 8:
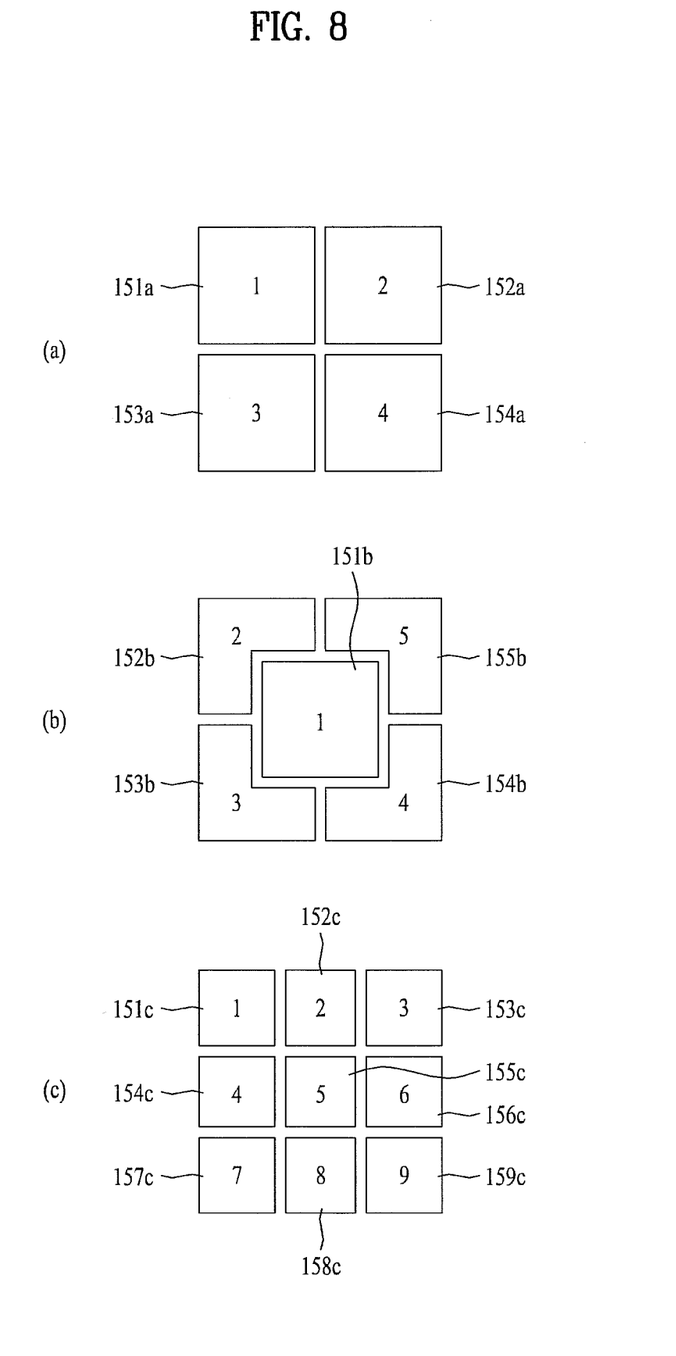
FIG. 8 is a diagram illustrating diverse examples of a thermoelectric module divided into plural ones provided in the projector.

FIG. 8 is a diagram illustrating diverse examples of the divided thermoelectric modules. This embodiment shown in FIG. 8 presents the thermoelectric module including the plural divided thermoelectric cells.

The different voltages can be applied to at least two the thermoelectric cells, respectively and the different voltages can be applied to at least two the thermoelectric cells in different points of time, respectively.

FIG. 8(a) shows the thermoelectric module including the thermoelectric cells arranged by 2×2 which is applied to the embodiment shown in FIG. 6. As mentioned above, only the first and fourth thermoelectric cells 151a and 154b or only the second and third thermoelectric cells 151c and 153d may be operated to control the heat transfer performance. As mentioned above, the heat transfer performance of the predetermined one thermoelectric module or more may be controlled by the size of the voltage applied thereto.

FIG. 8(b) shows that a rectangular-shaped first thermoelectric cell 151b is arranged in a center portion and second to fifth thermoelectric cells 152b to 155b are arranged around the first thermoelectric cell 151b. FIG. 8(c) shows thermoelectric cells arranged by 3×3 and a fifth thermoelectric cell 155c is arranged in a center portion.

The thermoelectric modules shown in FIGS. 8(b) and 8(c) have the first thermoelectric cell 151b and the fifth thermoelectric cell 155c arranged in center portions thereof, respectively. As mentioned above, the size of the DMD module 10 is much smaller than that of the heat sink member. Because of that, temperature distribution in the thermal diffusion member contacting with the heat absorbing surface of the thermoelectric module may not be uniform. That is, the thermal diffusion member contacting with the heat absorbing surface of the thermoelectric module may not have uniform temperature distribution. Specifically, the temperature of the center portion of the thermal diffusion member is the highest and the temperatures may be getting lower as farther from the center portion. The size of the DMD module is smaller than that of the thermal diffusion member and the portion of the thermal diffusion member correspondingly contacting with the DMD module or coupling member is the hottest.

As a result, the thermoelectric module is configured of the plural thermoelectric cells and predetermined ones of the thermoelectric cells located in the center portion are operated firstly. Alternatively, a relatively high voltage is applied to improve the heat transfer performance and the heat radiation efficiency may be improved.

The first and fifth thermoelectric cells 151b and 155c arranged in the center portion out of the plural thermoelectric modules shown in FIGS. 8(a) and 8(b) are operated prior to the other ones, or a relatively high voltage is applied to improve the heat transfer performance and the heat radiation efficiency may be improved.

As shown in FIGS. 1 and 2, one of the divided thermoelectric modules near the light source may be subject to overheating more easily because of the positions of the light source part 30 and the thermoelectric module.

During the selective or sequential operation of the divided thermoelectric modules, the thermoelectric cell near the light source part 30, for example, the thermoelectric cell located in a left portion out of the divided cells shown in FIG. 8 may be operated prior to the other ones or a higher voltage in an allowable range may be applied.

The thermoelectric modules may be put into operation together with the projector. An operational signal may be differentiated based on the temperature measured by a temperature sensor provided in the projector.

That is, if the DMD module is subject to overheating because of a high temperature inside the projector, a predetermined voltage may be applied in an allowable voltage range of the thermoelectric module to maximize the heat transfer performance.

In general, the conventional projector includes at least one temperature sensor and the temperature inside the projector is set in proportion to the speed of the fan. As a result, the size of the voltage applied to the thermoelectric module may be set in proportion to the temperature inside the projector or the speed of the fan. Detailed description for this configuration will be made later in reference to FIG. 10. As follows, a cooling method of a LCOS panel provided in a LCOS type projector using a reflective display module will be described in reference to FIG. 9.

Figure 9:
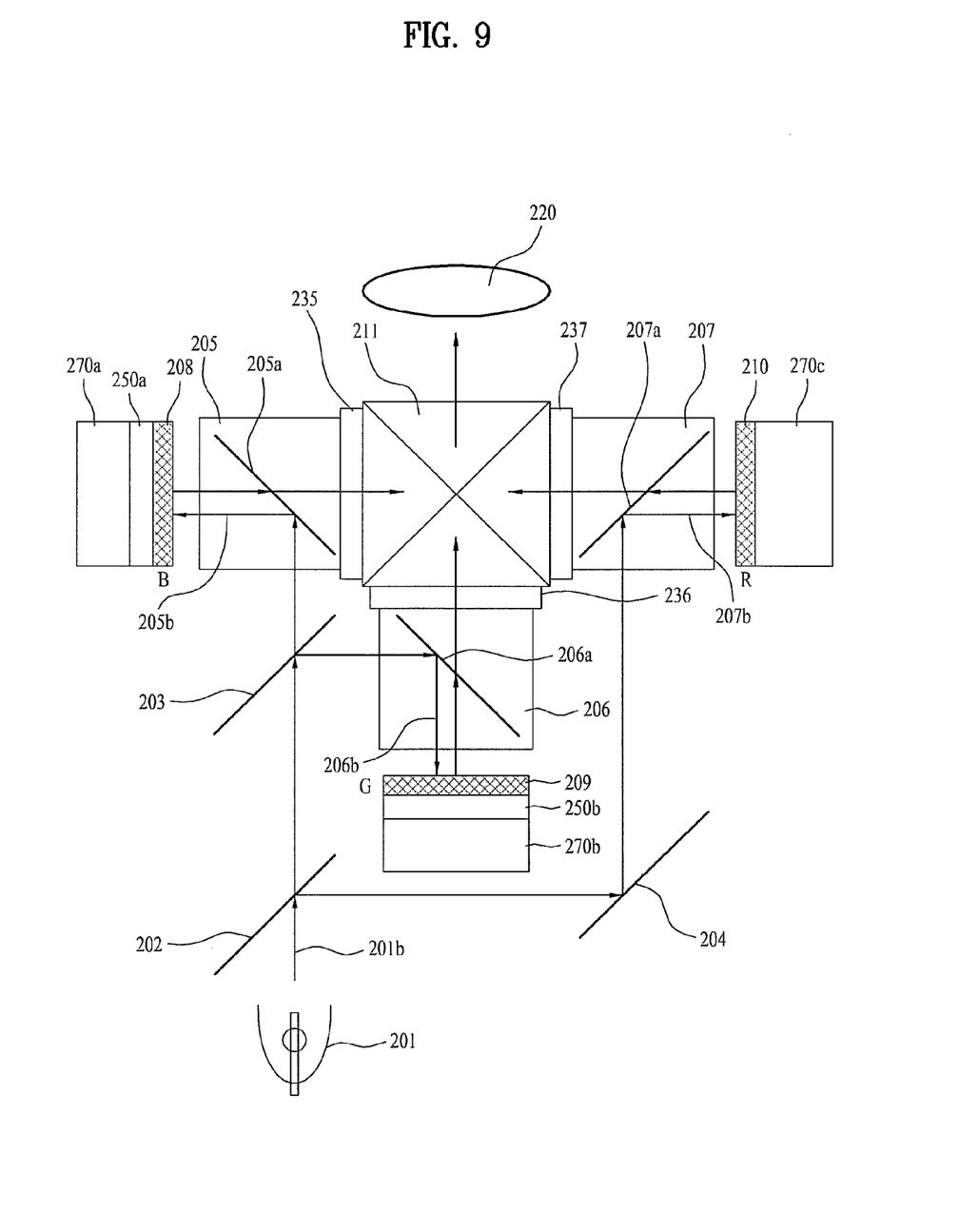
FIG. 9 is a diagram illustrating a projector according to another embodiment of the present invention.

FIG. 9 is a diagram illustrating a projector according to a still further embodiment of the present invention. The above embodiments present the DMD module and the cooling device provided in the DLP type projector. FIG. 9 shows a cooling device of the LCOS type projector.

The LCOS type projector shown in FIG. 9 is a basic optical system of the projector using a single light source and three LCOS panels 208, 209 and 210. As shown in FIG. 9, a light emitted from the light source 210, for example, a lamp is separately divided into R, G and B wavelengths by three dichroic mirrors 202, 203 and 204, to be incident on first to third polarizing beam splitters (hereinafter first to third PBS blocks (205, 206 and 207) corresponding to R, G and B, respectively. The first to third PBS blocks have polarizing PBS films 205a, 206a and 207a provided therein diagonally.

As a result, the lights incident on the first to third PBS blocks 205, 206 and 207 are polarized by the PBS films 205a, 206a and 207a only to be divided into S-polarized lights and P-polarized lights. The S-polarized lights (205b, 206b and 207b) are reflected on the first to third LCOS panels 208, 209 and 210 to have a structure enabling images represented.

That is, non-polarized lights provided from the single light source 201 are incident on the first dichroic mirror 202 and the first dichroic mirror 202 reflects red lights and transmits cyan lights. The red light reflected by the first dichroic mirror 202 is re-reflected by the mirror 204 to be incident on the third PBS block 207.

The third PBS block 207 separates the incident red light into an S-polarized light and a P-polarized light. Here, the S-polarized red light is re-reflected by the PBS 207 to be incident on the first reflection-type LCOS panel 210.

The cyan light transmitted the first dichroic mirror 202 is separated into green (G) and blue (B) lights by the second dichroic mirror 203 and the separated G and B lights may be incident on the second and third LCOS panels 208 and 209, respectively, in the same process of the red (R) light. The three colored lights having passed the LCOS panels 207, 208 and 209, respectively, are composed by a composition prism 211 used to finally compose colors and then the lights are projected to the screen via a projection lens 220.

Here, first to third spacer glasses 235, 236 and 237 are provided to adjust a focus distance between each of the first to third PBS blocks 205, 206 and 207 and the prism 211.

The display module used in the projector shown in FIG. 9 also converts the image signal provided from outside into the projecting image. Spectral color lights of the light emitted from the light source may be reflected to form the projection lights.

This type of the projector is also required to include a heat radiation device capable of radiate heat generated during the image conversion and projection light formation efficiently.

Because of that, first to third heat sink members 270a, 270b and 270c may be provided on rear surfaces of the LCOS panels 208, 209 and 210 for cooling, respectively.

Each of the spectral color lights separated for R, G and B wavelengths by the dichroic mirrors 202, 203 and 204 has a different energy from the other according to its wavelength. That is, blue spectral light having a short wavelength has a larger energy than a red spectral light having a long wavelength. The first LCOS panel 208 for the blue projecting light may be subject to overheating in comparison to the other second and third LCOS panels 209 and 210. Because of that, it is required to cool the panels separately.

As a result, a thermoelectric module 250a is mounted between the first LCOS panel 208 and a heat sink member 270a for cooling the first LCOS panel 208, to maximize the heat transfer performance and to improve cooling efficiency.

According to the embodiment shown in FIG. 9, the thermoelectric module is provided to cool the first LCOS panel 208 and the second LCOS panel 209. However, it may be provided to cool the third LCOS panel 210 reflecting the red spectral light.

Here, the thermoelectric module for cooling the LCOS panel may be divided into the plural ones and the divided ones are selectively operated or controlled to differentiate the heat transfer performance.

Figure 10:
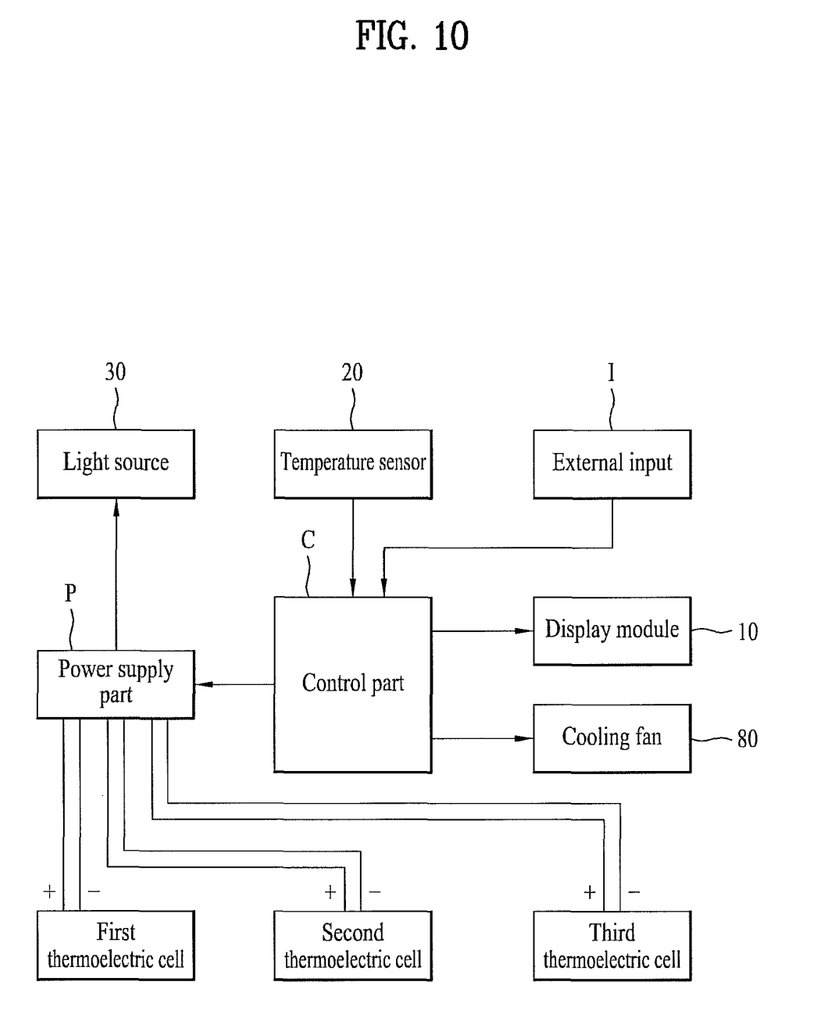
FIG. 10 is a diagram schematically illustrating configuration of the projector.

FIG. 10 is a diagram illustrating the configuration of the projector according to the above embodiment of the present invention.

The image signal supplied from an external input (I) is converted into the projecting image by the display module (10, DMD module or LCOS panel) via the control part (C). The spectral color lights supplied from the light source 30 are reflected on the display module 10 to be converted into the projecting light.

The control part (C) may be provided in the projector as substrate and it controls the power supply part (P), the display module 10 and the cooling fan 80.

Controlling the power supply part (P) means controlling the power supply part (P) by using the control part (C). Here, the control part and the power supply part may be integrally provided in a single substrate.

The power supply part (P) is serially connected with at least one thermoelectric cell (150-1, 2, . . . and n) composing the thermoelectric module to apply a DC voltage according to a control signal of the control part (C). The power supply part (P) may supply electric currents to the light source 30 according to the control signal of the control part (C).

When controlling the cooling fan 80, the control part (C) may determine the rotation speed of the cooling fan 80 based on temperature information measured by at least one temperature sensor 20 provided in the projector.

In addition, the control part (C) may control the DC voltage applied to the thermoelectric module in proportion to the temperature measured by the temperature sensor 20 in an allowable range, or in proportion to the rotation speed of the cooling fan 80.

Specifically, if it is determined by a cooling algorithm for cooling an inside of the projector that the inside of the projector is overheated, the voltage applied to the thermoelectric module may be increased within the allowable range.

If the plural divided thermoelectric modules are provided as mentioned above, each of the thermoelectric modules may be controlled selectively and the size of the voltage applied to each of them may be differentiated. This is because a predetermined portion of the display module might be overheated according to the positions of the display module and light source.

As a result, the control part (C) applies a higher voltage to a thermoelectric module near the light source or it operates the thermoelectric module prior to the other ones.

The control part (C) may control the voltage to be applied to the thermoelectric module as soon as the electric current is supplied to the light source. If the electric current is supplied to the light source 30, lights are provided and reflected on the display module and the display module starts to be heated.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A projector comprising:
   a display module converting an image signal into a projecting image;
   a thermoelectric module mounted to a rear surface of the display module;
   a control part controlling the display module and the thermoelectric module; and
   a heat sink member mounted on the thermoelectric module, the heat sink member comprising a plurality of heat radiation pins or heat radiation plates,
   wherein the thermoelectric module is divided into a plurality of thermoelectric cells and the plurality of the thermoelectric cells are connected to the control part,
   wherein the thermoelectric cells are divided into at least one center portion thermoelectric cell and at least one outer portion thermoelectric cell, and
   wherein the control part applies a voltage, that is relatively larger than a voltage applied to the at least one outer portion thermoelectric cell, to the at least one center portion thermoelectric cell or the control part starts to apply a voltage to the at least one center portion thermoelectric cell prior to the at least one outer portion thermoelectric cell.

2. The projector of claim 1, further comprising: a thermal diffusion member configured of metal and provided between the display module and the thermoelectric module.

3. The projector of claim 2, wherein an area of the thermal diffusion member is larger than an area of the rear surface of the display module.

4. The projector of claim 2, wherein the thickness of the thermal diffusion member is larger than the thickness of the thermoelectric module.

5. The projector of claim 2, further comprising a sealing member configured of silicon or rubber and covering an edge of the thermoelectric module positioned between the thermal diffusion member and the heat sink member.

6. The projector of claim 1, wherein the different voltages are applied to at least two the thermoelectric cells in different points of time, respectively.

7. The projector of claim 1, wherein the thermoelectric module cells composing the thermoelectric module comprise different sized thermoelectric cells.

8. The projector of claim 1, wherein the display module is one of a DMD module or a LCOS panel.

9. The projector of claim 8, wherein the LCOS panel comprises blue, green and red LCOS panels converting an image signal into blue, green and red projecting images and the thermoelectric module is mounted to a rear surface of at least one of the blue, green or red LCOS panels.

10. The projector of claim 9, wherein at least one of the thermoelectric modules mounted to the blue, green or red LCOS panels, has a different thickness or area from the other ones.

11. The projector of claim 9, wherein at least one of the thermoelectric modules mounted to the blue, green or red LCOS panels, has a different voltage applied thereto and a different operation point of time from the other ones.

12. The projector of claim 9, wherein the LCOS panel having the thermoelectric module mounted thereto comprises a blue LCOS panel.

13. A projector comprising:
    a light source comprising a lamp;
    a DMD module converting an image signal into a projecting image;
    a heat transfer member absorbing heat generated from the DMD module in a state of contacting with a rear surface of the DMD module on one surface and radiating the heat absorbed on the other surface and absorbing and radiating surfaces are changeable according to a direction of the DC voltage applying; and
    a heat sink member absorbing the heat transferred by the heat transfer member, the heat sink member comprising a heat sink area extending part for expanding a heat sink area
    wherein the heat transfer member is divided into a plurality of members and at least one of the divided heat transfer members near to the light source starts to operate prior to the other ones or has a relatively higher voltage applied thereto.

14. The projector of claim 13, further comprising:
    a thermal diffusion member provided between the heat transfer member and the DMD module to expand the heat absorbing area, the thermal diffusion member having an area larger than an area of the rear surface of the DMD module.

15. The projector of claim 13, wherein the heat transfer member is configured of heat transfer members divided in two lines and two columns and at least one of the divided heat transfer members positioned in a column near to the light source starts operation prior to the other ones or has a relatively higher voltage applied thereto.

* * * * *